H. W. O'DOWD.
HEATING APPARATUS.
APPLICATION FILED MAR. 1, 1916.

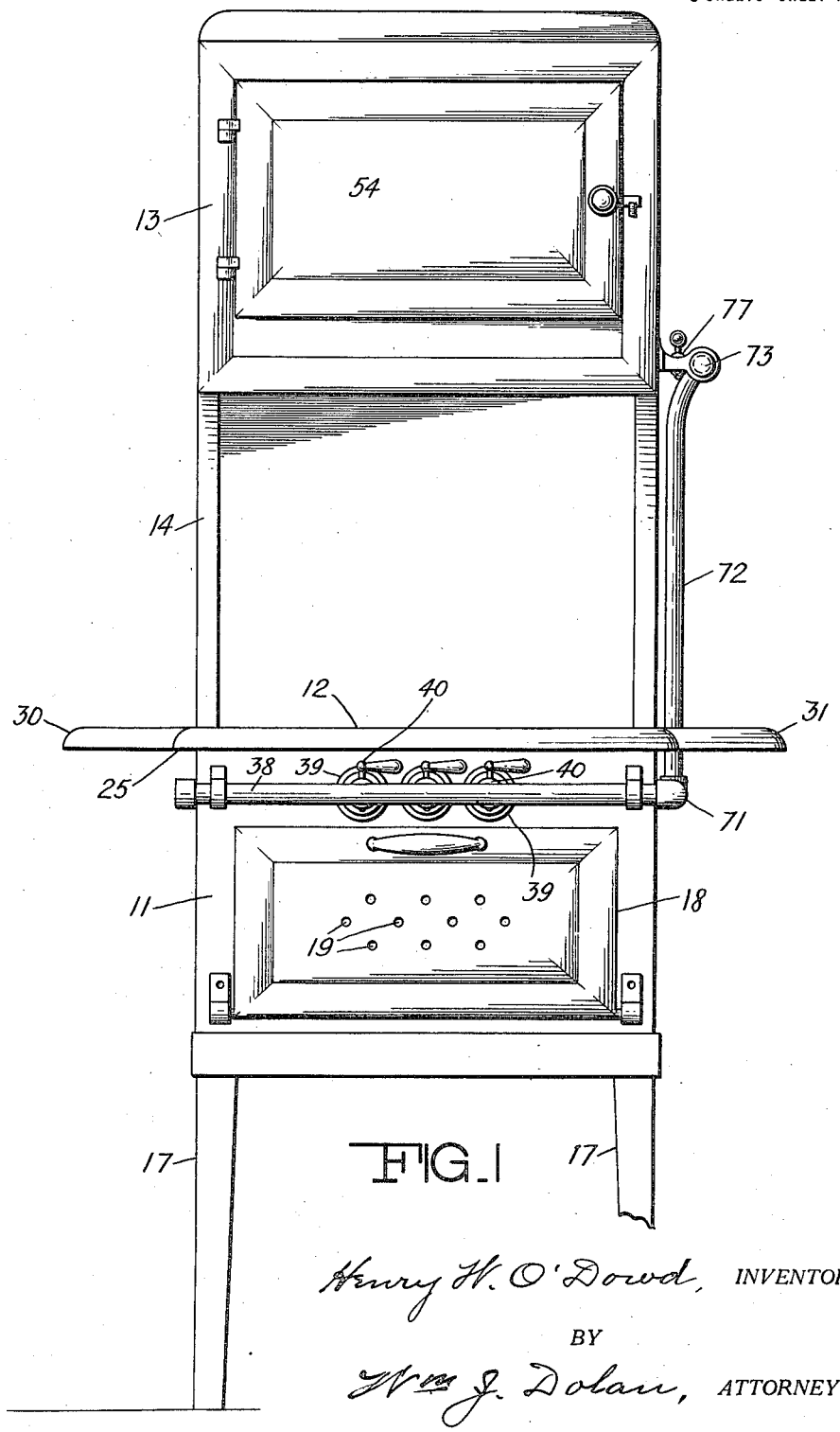

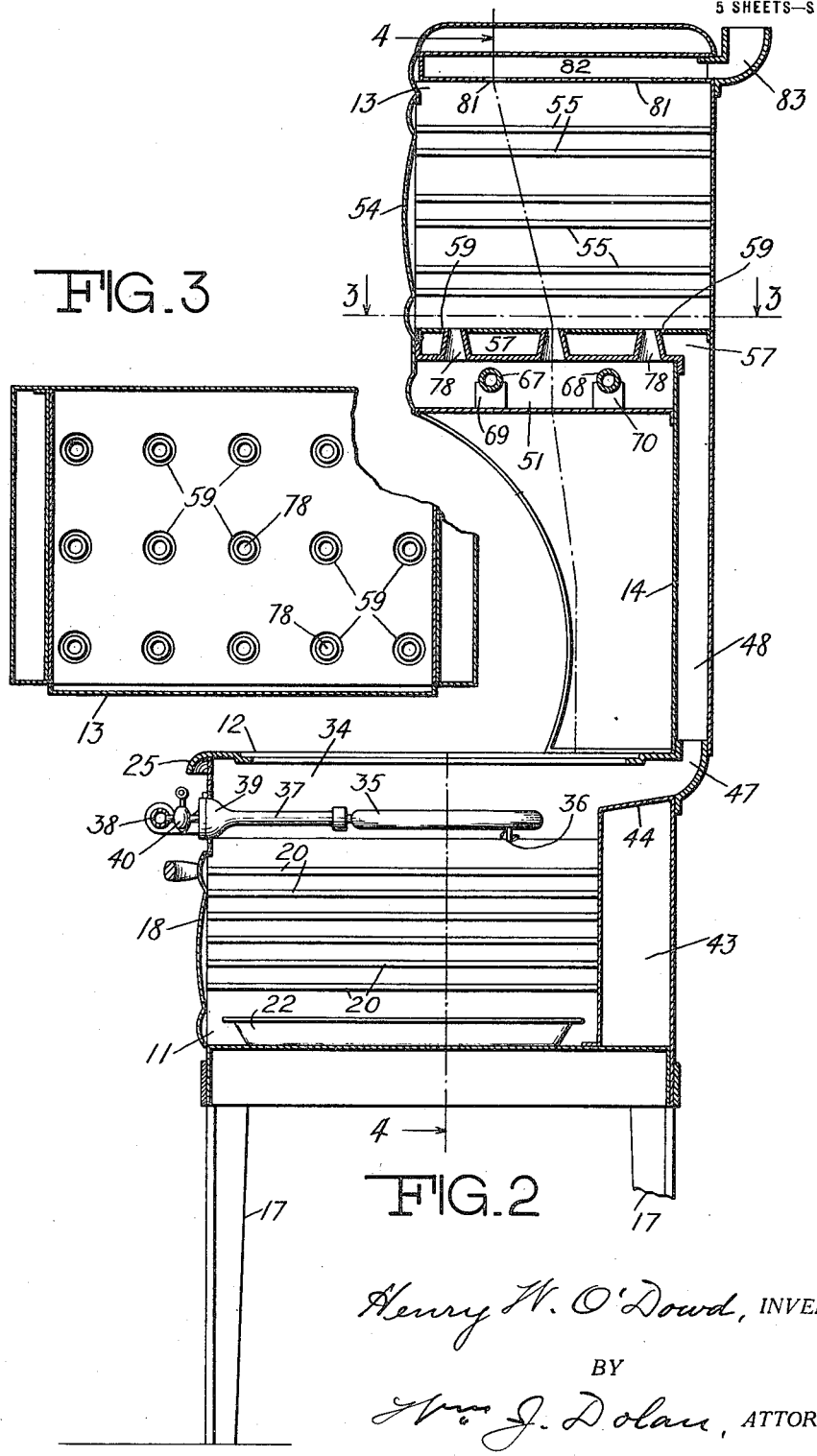

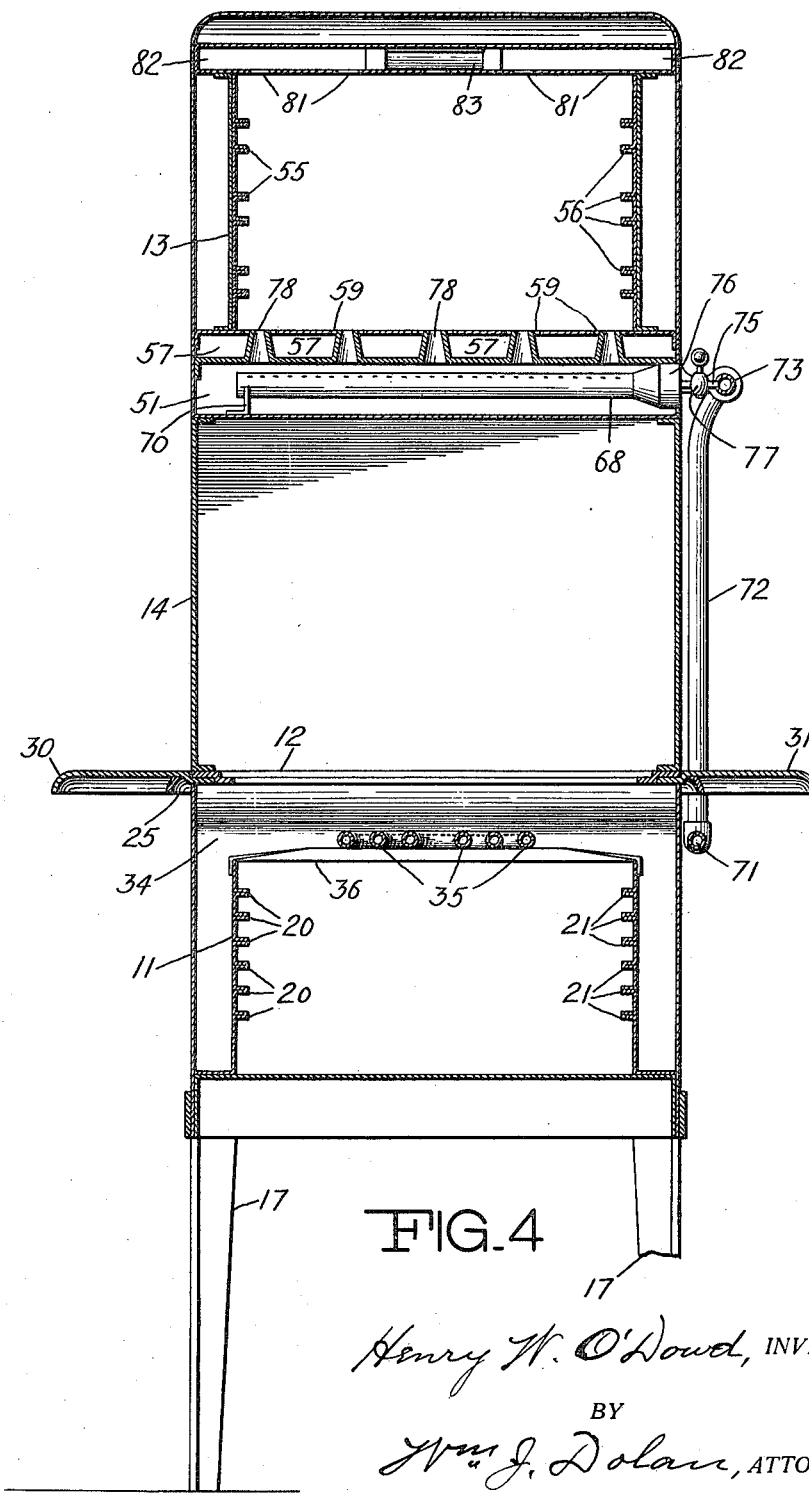

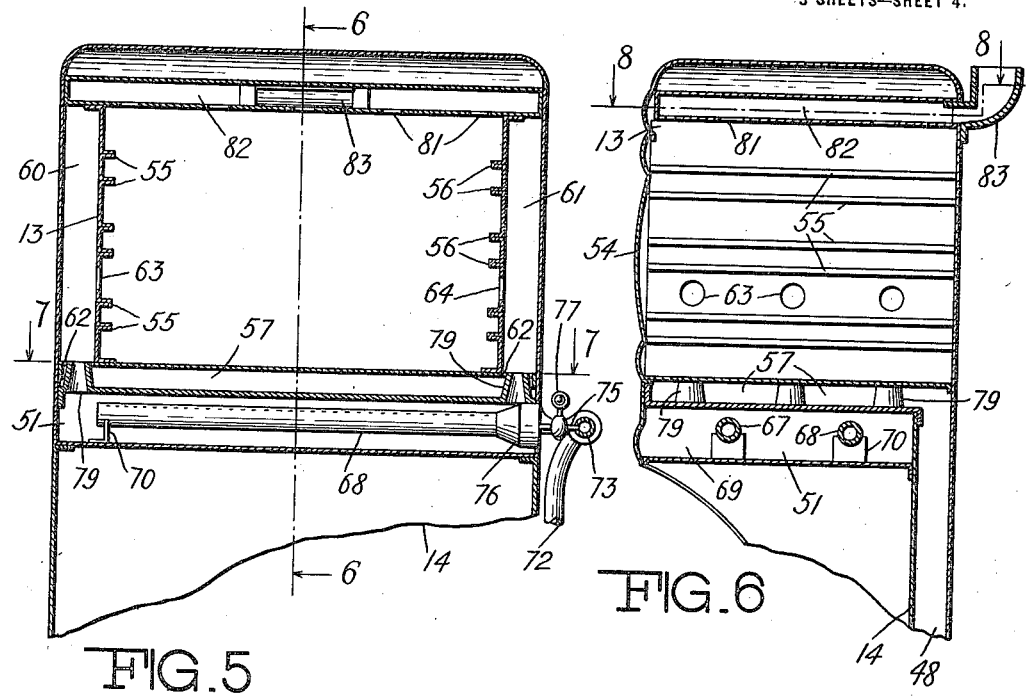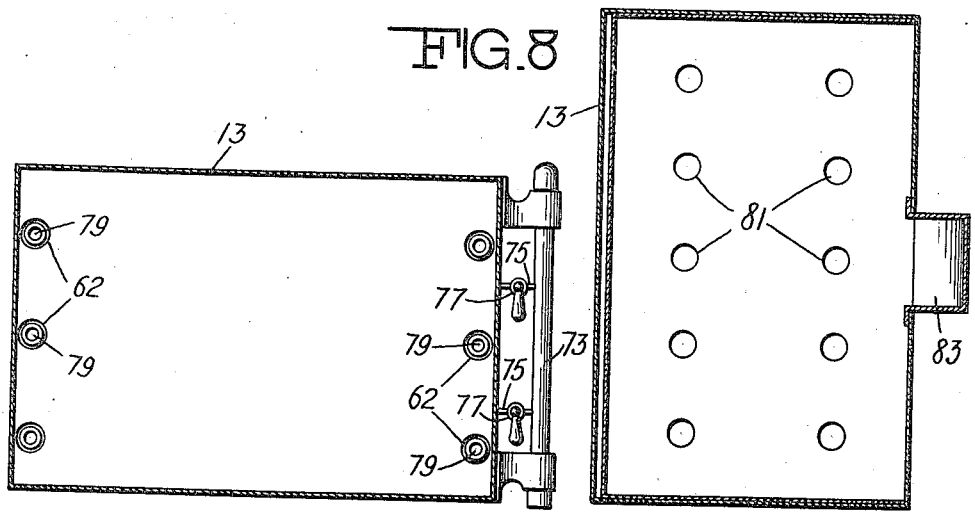

1,284,433.

Patented Nov. 12, 1918.
5 SHEETS—SHEET 5.

Henry W. O'Dowd, INVENTOR.
BY
Wm. J. Dolan, ATTORNEY

UNITED STATES PATENT OFFICE.

HENRY W. O'DOWD, OF JERSEY CITY, NEW JERSEY, ASSIGNOR TO WILLIAM M. CRANE COMPANY, A CORPORATION OF NEW YORK.

HEATING APPARATUS.

1,284,433.     Specification of Letters Patent.     Patented Nov. 12, 1918.

Application filed March 1, 1916. Serial No. 81,313.

*To all whom it may concern:*

Be it known that I, HENRY W. O'DOWD, a citizen of the United States, and a resident of Jersey City, Hudson county, State of New Jersey, have invented certain new and useful Improvements in Heating Apparatus, of which the following is a specification.

The present invention provides an improved form of stove, which is termed the elevated type, because furnished with a baking oven or baking and broiling compartment raised from the cooking surface, instead of having all such ovens and compartments situated close to it either above or below, or by the sides thereof, as in ordinary constructions.

The invention aims to produce a stove of the type aforesaid which shall have its several parts conveniently disposed in one vertical plane, within the narrowest limits compatible with efficiency, and at the same time be capable of discharging every function expected of any complete culinary apparatus of known description.

A further object is the provision of special heating and heat-transmitting means that will render the stove, with its various parts, available for the performance, simultaneously, of a number of distinct cooking operations, while using heat currents emanating from a single source only, and also adapt the stove for both independent and conjoined employment of a plurality of similar heat sources, according as conditions attending any particular culinary achievement may require.

To these and other useful ends, the invention consists of the divers elements, combinations and arrangements of stove parts, characterized by the novel features hereinafter set forth and claimed.

Referring to the drawings hereto appended, for a detailed illustration of preferred embodiments of the invention,—

Figure 1 is a front elevation of a stove constructed in accordance with the invention;

Fig. 2 is a side sectional elevation of the same, looking toward the left;

Fig. 3 is a sectional plan, partly broken, the section being on the line 3—3 of Fig. 2.

Fig. 4 is a sectional elevation, looking from the front of the stove, the section running along the irregular line 4—4 of Fig. 2;

Fig. 5 is a sectional front elevation of the upper part of the stove, illustrating a modified form thereof;

Fig. 6 is a sectional side elevation of the said upper part, the section being on the line 6—6 of Fig. 5, looking to the left;

Fig. 7 is a transverse section on the line 7—7 of Fig. 5, looking downward.

Fig. 8 is a similar section on the line 8—8 of Fig. 6;

Figure 9:
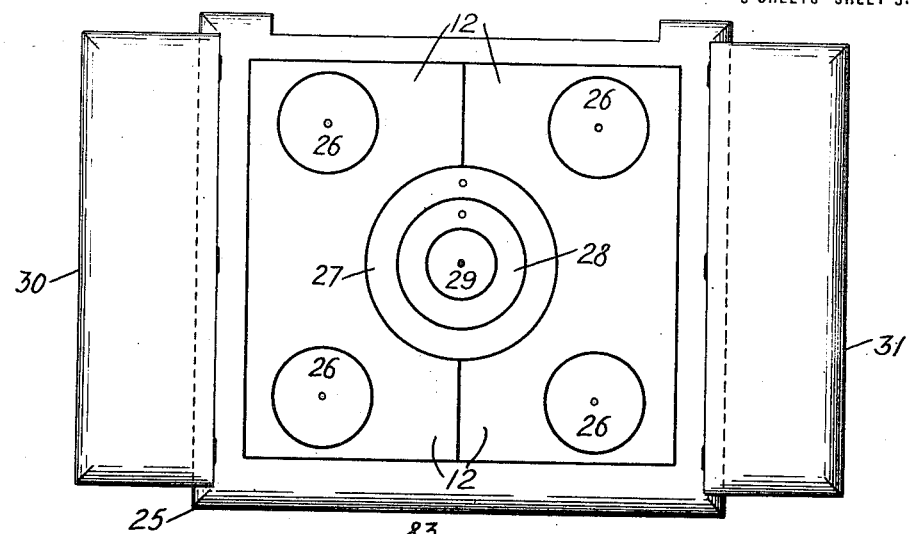
Fig. 9 is a top view of the cooking surface of the stove, detached.

Considered in its entirety, the stove herein illustrated constitutes a complete unit, available for general cooking purposes, whether used singly or in conjunction with additional apparatus of same description. In any of the forms shown, the unit comprises, as its principal parts, a combined oven and broiler section, designated by the reference numeral 11; a cooking surface 12, extending thereover; an elevated oven 13, located in the vertical plane of the cooking surface, but receding to some extent therefrom in a rearward direction, and a heat conveyer 14 of peculiar configuration, placed intermediately of the said surface and elevated oven, and providing a recess between the same.

The combined oven and broiler section 11 aforesaid preferably consists of a rectangular compartment, which may be mounted at any convenient height above the floor; for instance, on legs 17, or upon some base of any desired style or design. Ordinarily, this compartment will be kept closed by a door, as 18, formed with draft openings 19. Within the compartment, on opposite sides thereof, are ledges 20, 21 disposed in pairs, severally adapted to support a grid, or a number of shelves at varying distances from one another, the grid usually being employed in connection with a drip-pan, as 22.

Above the section 11 is placed the cooking surface 12, previously mentioned. The latter comprises a plurality of removable metal plates that are set within a flanged border 25, and formed each with pot-holes covered by lids, as 26. Centrally, the plates have a common opening closed by reducing rings 27, 28, and a smaller lid 29. The surface is also furnished with wings or lateral extensions 30, 31, which materially increase its capacity to accommodate utensils of various sorts and render it the more serviceable. All of these parts appear in the detached plan view, Fig. 9.

Between the cooking surface 12 and the upper interior part of the section 11 is provided a heat-generating chamber 34, designed to contain some suitable source of heat, which the drawings show as consisting of a series of gas-burners 35. Preferably, this series is of the annular, concentric type, and mounted as at 36, transversely of the combined oven and broiler section, beneath the top cooking surface, in such a manner that the flames of the burning gas can be directed either against the said surface or into the compartment below the generating chamber, as desired. The several units of the series are connected by separate feed-pipes 37, to a common supply-pipe 38, extending across the front of the stove, and each feed-pipe has its own air-mixer 39, and rotary valve 40, so that any one or two or more of the burners can be lighted at a given moment, according to the judgment of the operator, to generate the amount of heat required to be produced for the purpose in view. With this arrangement it is understood that the cooking can be carried on in various ways, as may be needed, through suitable manipulation of the burners, relatively to either the top surface, or the under oven, or the broiler. Thus, for example, the food to be cooked may be exposed to a direct flame over the surface 12, by removing any of its lids or rings; or a semi-contact with the fire can be obtained through the medium of ordinary utensils; or the heat may be utilized as reflected from the surface within the oven and broiler section beneath; or again a direct impingement of the caloric rays from the heat source can be had in the same section by inverting the burners; and so on.

Immediately to the rear of the said section 11 is a relatively narrow compartment 43, which takes up the space unoccupied by the combined oven and broiler, and adds sufficient width to the lower part of the stove to afford a firm base under the elevated oven 13. The latter-named compartment also constitutes an air-chamber adapted to receive and store unabsorbed heat from the section 11 that would otherwise radiate exteriorly in a rearward direction. With proper insulation of the outer walls of the stove, performed in the customary manner, the heat thus accumulating in the rear compartment or storage chamber 43 eventually radiates upward through the top 44 thereof, and merges with outgoing currents from the generating chamber 34, thereabove, which are disposed of as hereinafter described.

Heat emanating from the section 11, chamber 34, and compartment 43 that remains unconsumed in the lower part of the stove is carried up to the elevated oven 13, by means of the conveyer 14. As before stated, the elevated oven is in the vertical plane of the cooking surface 12, but recedes therefrom rearwardly, terminating short of the same in front. The oven 13 is sustained in its raised position by the body or frame of the conveyer 14, which rises from the rear of the surface 12, and communicates at its base with an outlet 47, provided for the generating chamber 34, directly above the top 44 of the compartment 43. The said conveyer, as shown, is arcuate in transverse section, and made hollow, as at 48, to afford an adequate passageway for the volatile products of combustion.

A recess of ample dimensions is formed between the cooking surface 12 and the elevated oven 13 by the conveyer 14, as will be seen by reference to the principal figures of the drawings. As there indicated, this recess extends approximately for the full width of the cooking surface from side to side, and for some distance within the border flange 25 clear to the back of the lower part of the stove in a fore-and-aft direction. It is of proportionate size vertically, reaching from the cooking surface to the underside of the elevated oven, or rather up to a second heat-generating chamber 51, situated under the latter, and more particularly referred to hereinafter. The recess, it will be noted, includes the rear portion of the plates that cover the chamber 34 containing the burners 35, and is heated thereby, as well as by the circumscribing heat-conveyer, and the underside of the elevated oven or its said chamber 51 reflecting heat currents downwardly toward the cooking surface. The uses which the said recess can be put to are apparent and therefore need not be expounded herein.

The elevated oven 13 comprises a compartment similar to the lower section 11 before mentioned, with a normally closed door 54, and side rests 55, 56, disposed oppositely in pairs for the reception of a plurality of shelves (not shown). This upper oven is further provided with a double or hollow bottom, as 57, intended to supply it with heat both directly and indirectly, as will now be explained.

From the conveyer 14 the heat currents naturally ascend into the said hollow bottom 57 of the elevated oven, and thence may be delivered into the interior of the latter in different ways, two of which are illustrated in the drawings herewith. Thus, in accordance with the construction shown in Figs. 2, 3, 4 and 10, the currents may be permitted to rise in a straight course upward, through apertures 59, formed at more or less regular intervals apart in the upper plate of the bottom 57. Or, as represented in Figs. 5, 6 and 7, the currents can be diverted laterally between the plates composing the hollow bottom, and caused to ascend into vertical flues 60, 61, on opposite sides of the elevated oven, through marginal apertures 62, in the upper bottom plate. From these flues, the currents are admitted into the interior of the oven through ports 63, 64, in its side walls. In either case, it will be observed, there is direct delivery of heat to the oven interiorly, and besides, the oven is in some degree heated exteriorly by radiation, due to contact of the currents with the imperforate portions of the hollow bottom 57, or with both such portions and the unapertured parts of the lateral flues 60, 61.

The transmission of heat is likewise direct and indirect from the second generating chamber 51, previously spoken of, to the elevated oven overlying the same. The chamber 51 is located at or within the upper part of the recess formed by and between the cooking surface 12, the oven 13 and the heat conveyer 14, before described. The heat is generated therein, preferably as in the lower chamber 34, by means of gas-burners 67, 68, mounted as at 69, 70, under the hollow bottom 57 of the elevated oven. The burners 67, 68 are conveniently supplied with gas from the main pipe 38 through branch-pipes 71, 72 and 73, to the uppermost one of which these burners are respectively connected by smaller feed-pipes, as 75, each fitted in the usual manner with an air-mixer 76, and a rotary valve 77. As in the case of the first generating chamber, the heat from the second chamber, in the forms of the invention represented by the annexed drawings, is allowed to reach the interior of the elevated oven in either one of two ways, both illustrated. According to Figs. 2, 3, 4 and 10, the heat developed by the burners 67, 68 is enabled to ascend into the elevated oven through tubular passageways or flues 78, traversing the hollow bottom 57. By preference, these passageways have their discharge orifices centrally located within the apertures 59, restricting the apertures and causing heat currents from both sources to mingle at the point where they enter the elevated oven. Optionally, however, the heat may be conveyed into the elevated oven pursuant to the method exemplified in Figs. 5, 6 and 7, wherein the chamber 51 is shown as having passageways 79, at the sides only, which lead up the heat generated by the burners 67, 68 into the flues 60, 61, whence the heat is made to enter the oven through the lateral apertures 63, 64. The passageways 79, it will be seen, project centrally into the apertures 62 of the hollow bottom. It will be noted also that a portion of the heat from the burners 67, 68 is indirectly transmitted into the oven 13 by radiation, through contact with its said hollow bottom, or with both the latter and the walls of the side flues, depending on which construction is followed.

Apertures are provided in the top of the elevated oven, as at 81, to afford exits for the volatile products resulting from the consumption of gas, as also for the vapors arising from the food during the cooking process. These products and vapors are first collected, however, in a horizontally disposed flue 82, overlying the top wall of the oven, so that the latter will absorb and retain such heat as they may still possess, before allowing them to escape. After filling up or spreading throughout this horizontal flue, the combined vapors and products of combustion are permitted to emerge through a relatively narrow outlet 83, located at the rear upper end of the stove, in position to be connected with any suitable external pipe or chimney (not shown). The outlet 83, it will be observed, constitutes the upper end of a continuous draft passage beginning with the openings 19 in the door 18, and including the lower stove section 11, the chamber 34, the conveyer 14 and the elevated oven 13, with its flues, apertures, and hollow bottom.

Figure 10:
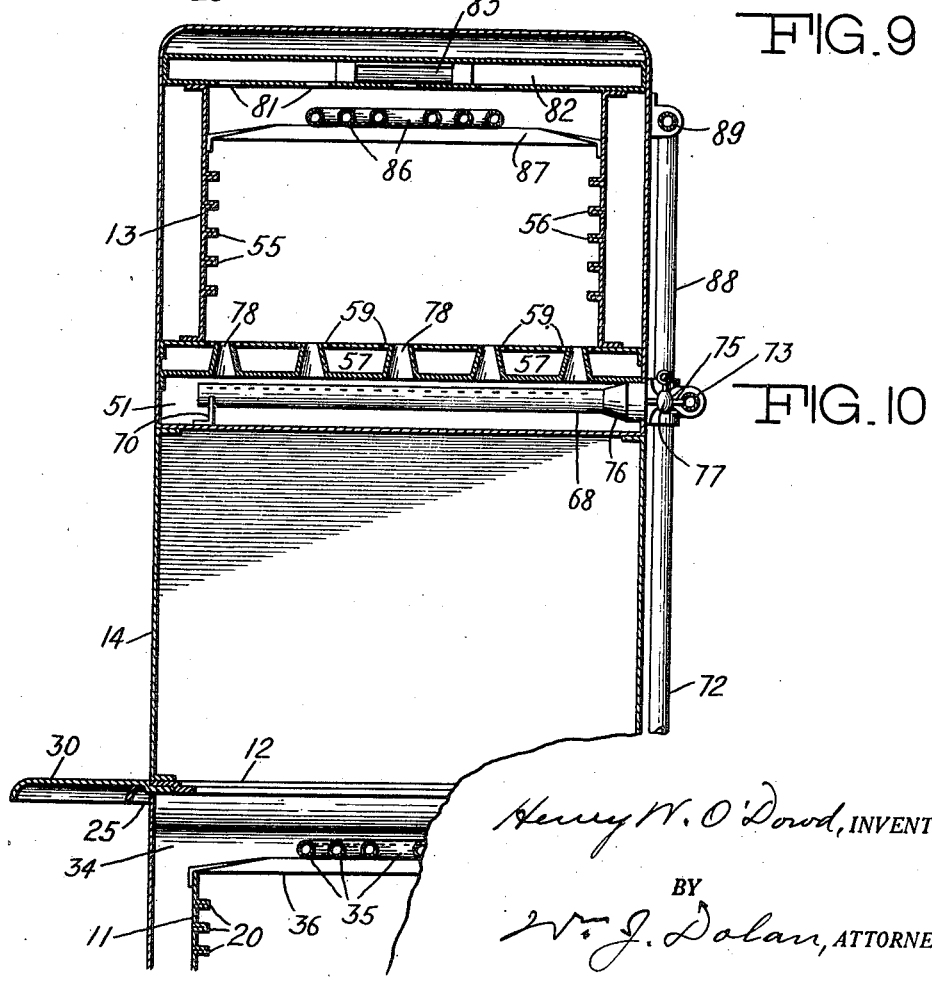
Fig. 10 is a broken sectional front elevation, showing a further modification in the upper part of the stove.

In Fig. 10 is included an additional series of burners 86, shown as resting upon a transverse support 87 in the upper part of the oven 13. These additional burners render the upper part of the stove available both as an elevated oven and as an elevated broiler section, similarly to the lower section first herein described. The fuel gas may be supplied to the burners 86 in the same manner as was previously explained with reference to the lower burners 35 and the intermediate burners 67, 68, to wit, from the main pipe 38, through extension pipes 88, 89, coupled with either of the branch-pipes 72, 73, and connected to the burners of the series 86 with the requisite equipment of feed-pipes, air-mixers and rotary valves, as in the other instances. By thus converting the top part of the improved stove into a combined oven and broiler of elevated type, the efficiency of the stove is not only enhanced in a remarkable degree, but manifestly a most intense heat can be developed and maintained therein, which it would be impossible to generate in some stoves, as ordinarily built or manufactured.

I claim:

1. A stove structure comprising a plurality of spaced-apart compartments, one arranged above the other; a heat generating chamber in the lower compartment; a source of heat therein; an outlet for heat currents from the generating chamber; a hollow bottom in the upper compartment, said compartment being also provided with an opening; a conveyer establishing communication between the heat generating chamber in the lower compartment and the hollow bottom in the upper compartment; and a flue disposed in the hollow bottom and restricting the opening in said compartment.

2. A stove structure including a casing; an oven therein; a heat generating chamber at the upper portion of said oven; a source of heat therein; a cooking surface above the source of heat; a second oven above and in spaced relation to the cooking surface; an outlet for heat currents from the heat generating chamber; a hollow bottom in said elevated oven; said oven being also provided with openings; a heat conveyer connecting said heat generating chamber and the hollow bottom; and a flue disposed in spaced relation to the edges of an opening in the oven.

3. A stove structure including a casing; an oven therein; a heat generating chamber at the upper portion of said oven; a source of heat therein; a cooking surface above the source of heat; a second oven above and in spaced relation to the cooking surface; an outlet for heat currents from the heat generating chamber; a hollow bottom in said elevated oven; said oven being also provided with openings; a heat conveyer connecting said heat generating chamber and the hollow bottom; a heat generating chamber for the upper compartment; a source of heat therein; and means for mingling the heat currents from both compartments at the point where they enter the oven.

4. A stove structure comprising a plurality of spaced-apart compartments, one arranged above the other; a heat generating chamber in the lower compartment; a source of heat therein; an outlet for heat currents from the generating chamber; a hollow bottom in the upper compartment, said compartment being also provided with an opening; a conveyer establishing communication between the heat generating chamber in the lower compartment and the hollow bottom in the upper compartment; a heat generating chamber for the upper compartment; a source of heat therein; and a flue connecting said heat generating chamber with said compartment and restricting an opening therein.

5. A stove structure including a casing; an oven therein; a heat generating chamber at the upper portion of said oven; a source of heat therein; a cooking surface above the source of heat; a second oven above and in spaced relation to the cooking surface; an outlet for heat currents from the heat generating chamber; a hollow bottom in said elevated oven; said oven being also provided with openings; a heat conveyer connecting said heat generating chamber and the hollow bottom; a heat generating chamber for the upper compartment; a source of heat therein; means for mingling the heat currents from both compartments at the point where they enter the oven, the oven being provided with openings communicating with said space; and means for directing heat currents through the oven and out at the top thereof.

6. A stove structure including a casing; an oven therein; a heat generating chamber at the upper portion of said oven; a source of heat therein; a cooking surface above the source of heat; a second oven above and in spaced relation to the cooking surface; an outlet for heat currents from the heat generating chamber; a hollow bottom in said elevated oven; said oven being also provided with openings; a heat conveyer connecting said heat generating chamber and the hollow bottom; flues disposed in spaced relation to the edges of the openings in the upper oven; a door for the lower oven, said door being provided with an opening; and means for directing a draft through said opening, through the heat generating compartment in the lower oven, the heat conveyer, the hollow bottom, through the upper oven and out at the top thereof.

In testimony whereof I have signed my name to this specification.

HENRY W. O'DOWD.